United States Patent
Qi et al.

(10) Patent No.: US 7,811,731 B2
(45) Date of Patent: *Oct. 12, 2010

(54) PHOTOCONDUCTIVE MEMBERS

(75) Inventors: Yu Qi, Oakville (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 1377 days.

This patent is subject to a terminal disclaimer.

(21) Appl. No.: 11/260,249

(22) Filed: Oct. 28, 2005

(65) Prior Publication Data

US 2007/0087277 A1 Apr. 19, 2007

Related U.S. Application Data

(60) Provisional application No. 60/726,507, filed on Oct. 14, 2005.

(51) Int. Cl.
*G03G 5/14* (2006.01)
(52) U.S. Cl. .................. 430/66; 430/58.55; 430/58.65; 430/58.7; 430/58.75; 430/58.8
(58) Field of Classification Search .................. 430/66, 430/67, 58.65, 58.7, 59.4, 58.55, 58.75, 58.8; 399/159
See application file for complete search history.

(56) References Cited

U.S. PATENT DOCUMENTS

| | | | |
|---|---|---|---|
| 3,121,006 A | 2/1964 | Middleton et al. | |
| 4,265,990 A | 5/1981 | Stolka et al. | |
| 4,286,033 A | 8/1981 | Neyhart et al. | |
| 4,291,110 A | 9/1981 | Lee | |
| 4,298,697 A | 11/1981 | Baczek et al. | |
| 4,338,387 A | 7/1982 | Hewitt | |
| 4,338,390 A | 7/1982 | Lu | |
| 4,457,994 A | 7/1984 | Pai et al. | |
| 4,560,635 A | 12/1985 | Hoffend et al. | |
| 4,654,284 A | 3/1987 | Yu et al. | |
| 4,871,634 A | 10/1989 | Limburg et al. | |
| 5,368,967 A | 11/1994 | Schank et al. | |
| 5,418,107 A | 5/1995 | Nealey et al. | |
| 5,702,854 A | 12/1997 | Schank et al. | |
| 5,709,974 A | 1/1998 | Yuh et al. | |
| 5,976,744 A | 11/1999 | Fuller et al. | |
| 6,127,078 A | 10/2000 | Omokawa et al. | |
| 6,492,081 B2 * | 12/2002 | Morikawa et al. | 430/66 |
| 6,555,279 B2 * | 4/2003 | Nakata et al. | 430/66 |
| 7,560,205 B2 * | 7/2009 | Qi et al. | 430/58.75 |
| 2002/0182524 A1 | 12/2002 | Uchida et al. | |
| 2004/0101774 A1 * | 5/2004 | Yoshimura et al. | 430/66 |
| 2006/0029870 A1 * | 2/2006 | Nukada et al. | 430/56 |
| 2007/0020540 A1 * | 1/2007 | Qi et al. | 430/58.2 |

FOREIGN PATENT DOCUMENTS

| | | |
|---|---|---|
| EP | 1 241 529 | 10/2000 |
| EP | 1 174 771 A1 | 1/2002 |
| GB | 1 299 497 | 12/1972 |
| JP | 2000-075516 | * 3/2000 |

OTHER PUBLICATIONS

Diamond, A.S., ed., Handbook of Imaging Materials, Marcel Dekker, Inc., NY (1991), pp. 395-396.*
Grant, R., et al., ed., Grant & Hackh's Chemical Dictionary, fifth edition, McGraw-Hill Book Company, NY (1987), pp. 503-504.*
Japanese Patent Office machine-assisted translation of JP 2000-075516 (pub. Mar. 2000).*
European Search Report mailed Feb. 16, 2007.
Liu et al., "Rhenium(I)-Catalyzed Formation of a Carbon-Oxygen Bond: An Efficient Transition Metal Catalytic System for Etherification of Benzyl Alcohols", Organometallics, vol. 24, pp. 2819-2821, 2005.
Jun. 13, 2010 Chine Office Action issued in corresponding Chinese Application No. 200610135930.3 with English translation.

* cited by examiner

*Primary Examiner*—Janis L Dote
(74) *Attorney, Agent, or Firm*—Oliff & Berridge, PLC

(57) ABSTRACT

A photoconductive imaging member including at least a charge generating layer, a charge transport layer, and an overcoat layer. The overcoat layer includes a cured or substantially crosslinked product of at least a phenol compound and a charge transport compound.

9 Claims, No Drawings

PHOTOCONDUCTIVE MEMBERS

This nonprovisional application claims the benefit of U.S. Provisional Application No. 60/726,507, filed Oct. 14, 2005.

BACKGROUND

Described herein is a photoconductive member, and more specifically a layered member that comprises an overcoat layer that includes a cured or substantially crosslinked product of at least a phenol compound and a charge transport compound. The charge transport compound contains, for example, at least one alkoxyalkyl group, such as an alkoxymethyl group.

The overcoated photoconductive member possesses a number of advantages, including for example: (1) excellent coating characteristics and adherence of the coating to the charge transport layer and avoiding perturbation of underlying layers, including charge transport layers, during coating; (2) being capable of producing excellent image quality; (3) exhibiting mechanical robustness, for example withstanding up to 1,500,000 imaging cycles, and exhibits extended wear characteristics; and (4) having the capability of transporting holes and resisting image deletion.

The photoconductive members described herein may be used in, for example, electrophotographic imaging devices and xerographic imaging devices, printing processes, color imaging processes, copying/printing/scanning/fax combination systems and the like. The photoconductive member may be, for example, a photoreceptor, and may have any suitable form, for example plate or drum form.

Photosensitive members such as electrophotographic or photoconductive members, including photoreceptors or photoconductors, typically include a photoconductive layer formed on, for example, an electrically conductive substrate or formed on layers between the substrate and photoconductive layer. The photoconductive layer is an insulator in the dark, so that electric charges are retained on its surface. Upon exposure to light, the charge is dissipated, and an image can be formed thereon, developed using a developer material, transferred to a copy substrate, and fused thereto to form a copy or print.

Advanced imaging systems are based on the use of small diameter photoreceptor drums. The use of small diameter drums places a premium on photoreceptor life. A factor that can limit photoreceptor life is wear. Small diameter drum photoreceptors are particularly susceptible to wear because about 3 to 10 revolutions of the drum may be required to image a single letter size page. Multiple revolutions of a small diameter drum photoreceptor to reproduce a single letter size page can thus require about 1 million cycles or more from the photoreceptor drum to obtain 100,000 prints, one desirable print job goal for commercial systems.

For low volume copiers and printers, bias charging rolls (BCR) are desirable because little or no ozone is produced during image cycling. However, the microcorona generated by the BCR during charging damages the photoreceptor, resulting in rapid wear of the imaging surface, for example, the exposed surface of the charge transport layer. More specifically, wear rates can be as high as about 10 microns per 100,000 imaging cycles.

REFERENCES

Various overcoats employing alcohol soluble polyamides have been proposed. Disclosed in U.S. Pat. No. 5,368,967 is an electrophotographic imaging member comprising a substrate, a charge generating layer, a charge transport layer, and an overcoat layer comprising a small molecule hole transporting arylamine having at least two hydroxy functional groups, a hydroxy or multihydroxy triphenyl methane, and a polyamide film forming binder capable of forming hydrogen bonds with the hydroxy functional groups such as the hydroxy arylamine and hydroxy or multihydroxy triphenyl methane. This overcoat layer may be fabricated using an alcohol solvent. This electrophotographic imaging member may be used in an electrophotographic imaging process. Specific materials including ELVAMIDE® polyamide, N,N'-diphenyl-N,N'-bis(3-hydroxyphenyl)-(1,1'-biphenyl)-4,4'-diamine and bis-[2-methyl-4-(N-2-hydroxyethyl-N-ethyl-aminophenyl)]-phenylmethane are disclosed in this patent.

A crosslinked polyamide overcoat is known, comprising a crosslinked polyamide containing N,N'-diphenyl-N,N'-bis(3-hydroxyphenyl)-(1,1'-biphenyl)-4,4'-diamine, and referred to as LUCKAMIDE®. In order to achieve crosslinking, a polyamide polymer having N-methoxymethyl groups (LUCKAMIDE®) was employed along with a catalyst such as oxalic acid. This overcoat is described in U.S. Pat. No. 5,702,854, the entire disclosure thereof being incorporated herein by reference.

Disclosed in U.S. Pat. No. 5,976,744 is an electrophotographic imaging member including a supporting substrate coated with at least one photoconductive layer, and an overcoating layer. The overcoating layer includes hydroxy functionalized aromatic diamine and a hydroxy functionalized triarylamine dissolved or molecularly dispersed in a crosslinked acrylated polyamide matrix. The hydroxy functionalized triarylamine is a compound different from the polyhydroxy functionalized aromatic diamine.

Disclosed in U.S. Pat. No. 5,709,974 is an electrophotographic imaging member including a charge generating layer, a charge transport layer and an overcoating layer. The transport layer includes a charge transporting aromatic diamine molecule in a polystyrene matrix. The overcoating layer includes a hole transporting hydroxy arylamine compound having at least two hydroxy functional groups, and a polyamide film forming binder capable of forming hydrogen bonds with the hydroxy functional groups of the hydroxy arylamine compound.

Disclosed in U.S. Pat. No. 5,368,967 is an electrophotographic imaging member comprising a substrate, a charge generating layer, a charge transport layer, and an overcoat layer comprising a small molecule hole transporting arylamine having at least two hydroxy functional groups, a hydroxy or multihydroxy triphenyl methane, and a polyamide film forming binder capable of forming hydrogen bonds with the hydroxy functional groups such as the hydroxy arylamine and hydroxy or multihydroxy triphenyl methane. This overcoat layer may be fabricated using an alcohol solvent. This electrophotographic imaging member may be used in an electrophotographic imaging process. Specific materials including ELVAMIDE® polyamide and N,N'-diphenyl-N,N'-bis(3-hydroxyphenyl)-(1,1'-biphenyl)-4,4'-diamine and bis-[2-methyl-4-(N-2-hydroxyethyl-N-ethyl-aminophenyl)]-phenylmethane are disclosed in this patent.

Disclosed in U.S. Pat. No. 4,871,634 is an electrostatographic imaging member containing at least one electrophotoconductive layer. The imaging member comprises a photogenerating material and a hydroxy arylamine compound represented by a certain formula. The hydroxy arylamine compound can be used in an overcoat with the hydroxy arylamine compound bonded to a resin capable of hydrogen bonding such as a polyamide possessing alcohol solubility.

Disclosed in U.S. Pat. No. 4,457,994 is a layered photosensitive member comprising a generator layer and a transport layer containing a diamine type molecule dispersed in a polymeric binder, and an overcoat containing triphenyl methane molecules dispersed in a polymeric binder.

Disclosed in U.S. Pat. No. 5,418,107 is a process for fabricating an electrophotographic imaging member.

SUMMARY

In embodiments, described is a photoconductive imaging member comprising a substrate, a charge generating layer, a charge transport layer, and an overcoat layer comprising a substantially crosslinked product of at least a phenol compound and a charge transport compound.

In further embodiments, described is a molecule, and the process of making the molecule, represented by the formula A-(L-OR)$_n$, wherein A represents a charge transport component, L represents a linkage group, O represents oxygen, R represents hydrocarbyl, such as an alkyl, and n represents the number of repeating segments or groups.

In still further embodiments, there is disclosed an overcoat coating composition comprising at least a phenol compound and a charge transport compound, wherein the charge transport compound is represented by the formula A-(L-OR)$_n$, wherein A represents a charge transport component, L represents a linkage group, O represents oxygen, R represents a hydocarbyl group, such as an alkyl group, and n represents the number of repeating segments or groups.

In yet further embodiments, described is an image forming apparatus comprising at least one charging unit, at least one exposing unit, at least one developing unit, a transfer unit, a cleaning unit and a photoconductive imaging member. The photoconductive imaging member comprising a substrate, a charge generating layer, a charge transport layer, and an overcoat layer comprising a substantially cross linked product of at least a phenol compound and a charge transport compound.

EMBODIMENTS

The present disclosure relates generally to photoconductive members such as photoconductors, photoreceptors and the like, for example which may be used in electrophotographic or xerographic imaging processes. The photoconductive members have an overcoat layer that may achieve adhesion to the charge transport layer and exhibits excellent coating quality. Thus, the resulting imaging member achieves excellent image quality and mechanical robustness. The protective overcoat layer may increase the extrinsic life of a photoreceptor device and may maintain good printing quality and/or deletion resistance when used in an image forming apparatus.

The overcoat layer comprises the cured or substantially crosslinked product of at least a phenolic resin and/or phenol compound and a charge transport compound. The phenolic overcoat layer may further comprise a polymer binder.

Cured herein refers to, for example, a state in which the phenolic resin and/or phenol compounds in the overcoat coating solution have reacted with each other and/or the charge transport compound to form a substantially crosslinked product. Substantially crosslinked in embodiments refers to, for example, a state in which about 60% to 100% of the reactive components of the overcoat coating composition, for example about 70% to 100% or about 80% to 100%.

The curing or crosslinking of the reactive components occurs, in embodiments, following application of the overcoat coating composition to the previously formed structure of the imaging member. The overcoat coating composition thus comprises at least the phenolic resin and/or phenol compound(s) and the charge transport compound.

In embodiments, the overcoat layer comprises the cured or substantially crosslinked product of at least a phenol compound and a charge transport compound. The term "phenol compound" may include phenolic resins as disclosed herein.

The charge transport compound group can be represented by the formula of A-(L-OR)$_n$, wherein A represents a charge transport component, L represents a linkage group, O represents oxygen, R represents a hydrocarbyl, and n represents the number of repeating segments or groups. For example, the linkage group is an alkylene group having from 1 to about 8 carbon atoms, such as from 1 to about 5 carbon atoms, and "n" is an integer of 1 to about 8, such as from 1 to about 5.

"Hydrocarbyl" can refer to univalent groups formed by removing a hydrogen atom from a hydrocarbon. Examples of hydrocarbyls include alkyls, aryls, phenyls, and the like. A suitable hydrocarbyl for use herein may have from 1 to about 25 carbon atoms, such as from 1 to about 15 carbon atoms or from 1 to about 8 carbon atoms. In embodiments, the hydrocarbyl is an alkyl that may be linear, branched or cyclic having from 1 to 25 carbon atoms, such as from 1 to about 15 carbon atoms or from 1 to about 8 carbon atoms. If the hydrocarbyl is an alkyl, then (L-OR) may be referred to as an alkoxyalkyl.

In particular, the hydrocarbyl group is attached, via the oxygen atom thereof, to the charge transport component by a linkage group. The linkage group may be an alkylene linkage group, such as methylene, ethylene, propylene and the like.

In embodiments, the charge transport component A is selected from a group consisting of tertiary arylamines, pyrazolines, hydrazones, oxadiazoles, and stilbenes. In further embodiments, A is selected from the following groups:

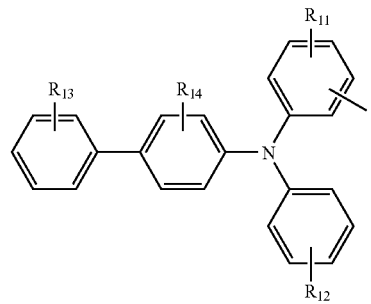

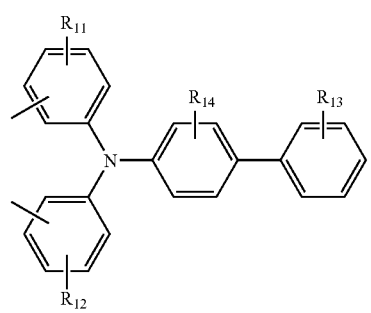

-continued

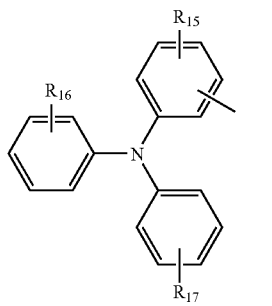

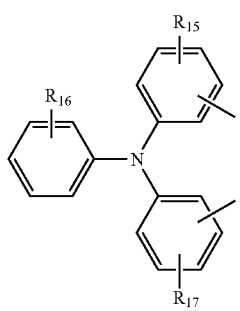

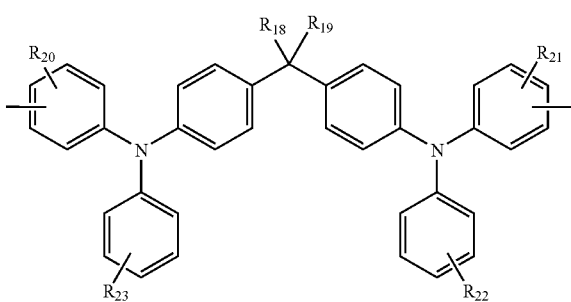

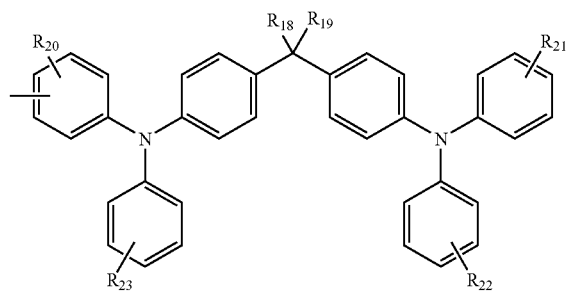

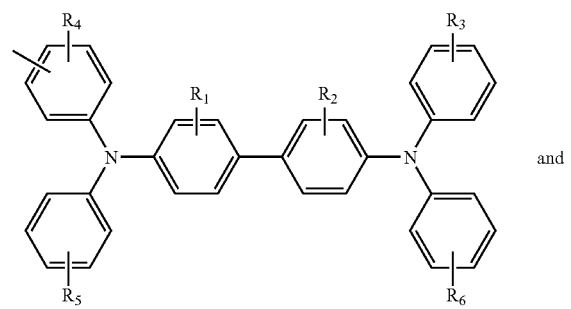

-continued

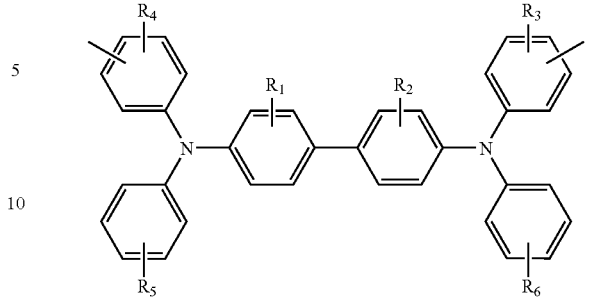

wherein $R_1$ to $R_{23}$ are each a hydrogen atom, an alkyl having for example from 1 to about 20 carbon atoms, such as from 1 to about 10 carbon atoms, an alkoxyl group having from 1 to about 10 carbon atoms, such as from 1 to about 5, or a halogen atom, such as fluorine, chlorine, bromine, iodine and astatine. In embodiments, the alkyl may be linear, branched or cyclic and includes for example, methyl, ethyl, propyl, isopropyl and the like.

The charge transport compound represented by the formula of $A\text{-}(L\text{-}OR)_n$ may be made by a variety of processes. In embodiments, $A\text{-}(L\text{-}OH)_n$ is mixed with R—OH in the presence of a catalyst. A condensation reaction occurs between the $A\text{-}(L\text{-}OH)_n$ and R—OH in the presence of the catalyst to generate $A\text{-}(L\text{-}OR)_n$ and water. As explained above, A represents a charge transport component, L represents a linkage group, OH represents a hydroxyl, R represents a hydrocarbyl, and n represents the number of repeating segments or groups. Once the condensation reaction is completed, the catalyst is removed from the solvent.

In embodiments, a charge transport compound represented by the formula $A\text{-}(CH_2\text{—}OR)_n$ is generated. In such embodiments, $A\text{-}(CH_2\text{—}OH)_n$ reacts with R—OH in the presence of a catalyst, and A represents a charge transport component, OH represents a hydroxyl, R represents an alkyl having from 1 to 15 carbons, and n represents the number of repeating segments or groups.

The catalyst may be an inorganic acid such as hydrochloric acid, sulfuric acid, nitric acid, and the like, and derivatives thereof; an organic acid such as acetic acid, trifluoroacetic acid, oxalic acid, formic acid, glycolic acid, glyoxylic acid, toluenesulfonic acid and the like; or a polymeric acid such as poly(acrylic acid), poly(vinyl chloride-co-vinyl acetate-co-maleic acid), poly(styrenesulfonic acid), and the like. Mixtures of any suitable acids may also be employed.

In embodiments, the catalyst may be a solid state catalyst such as acidic silica, acidic alumina, and a poly(styrenesulfonic acid). Other examples of solid state catalysts include AMBERLITE 15, AMBERLITE 200C, AMBERLYST 15, or AMBERLYST 15E (all are products of Rohm & Haas Co.), DOWEX MWC-1-H, DOWEX 88, or DOWEX HCR-W2 (all are products of Dow Chemical Co.), LEWATIT SPC-108, LEWATIT SPC-118 (both are products of Bayer A. G.), DIAION RCP-150H (a product of Mitsubishi Kasei Corp.), SUMKAION K-470, DUOLITE C26-C, DUOLITE C-433, or DUOLITE 464 (all are products of Sumitomo Chemical Co., Ltd.), NAFION-H (a product of Du Pont), and/or PUROLITE (a product of AMP Ionex Corp.

In the preparation of the charge transport compound, the $A\text{-}(L\text{-}OH)_n$ material may be present in amounts from about 5 weight percent to about 30 weight percent, such as from about 10 weight percent to about 25 weight percent of the reaction mixture. The R—OH may be present in amounts from about 50 weight percent to about 95 weight percent, such as from about 65 weight percent to about 95 weight percent, of the reaction mixture. The catalyst may be present in amounts from about 0.5 weight percent to about 10 weight percent, such as from about 1 weight percent to about 6 weight percent, of the reaction mixture.

The overcoat coating composition may contain from about 3 weight percent to about 80 weight percent of the charge transport compound, such as from about 3 weight percent to about 40 weight percent or from about 5 weight percent to about 40 weight percent, or such as from 3 weight percent to about 30 weight percent and from 3 weight percent to about 20 weight percent, of the charge transport compound.

The overcoat coating composition also includes a phenol compound. Phenol compound refers to, for example, any aromatic organic compound in which is present at least one benzene ring with one or more hydroxyl groups attached thereto. A phenol compound may thus also refer to a phenolic resin, such as a resole-type phenolic resin or a novolac-type phenolic resin.

In embodiments, the phenol compound used herein may be any variety of phenol compounds, for example including a phenol itself and its derivatives, resol, xylenol, resorcinol, naphthol and the like.

In embodiments, the phenol compound may also function as a reactant to achieve phenolic resin products. Phenolic resin herein refers to, for example a condensation product of phenol compound(s) with an additional compound such as an aldehyde (for example formaldehyde or acetaldehyde) or furfural. A resole-type phenolic resin may be formed through a reaction between a phenol and aldehyde, in the presence of a base catalyst. A novolac-type resin may be formed through a reaction between a phenol and an aldehyde, in the presence of an acid catalyst. Of course, suitable phenolic resins may also be commercially obtained.

In embodiments, the phenolic resin may be a resole-type phenolic resin. The weight average molecular weight of the resin may range from, for example, about 300 to about 50,000, such as about 500 to 35,000 or about 1,000 to about 35,000. The phenolic resins that may be employed herein include, for example, PL4852 (Gun'ei Kagaku Kogyo K.K.), formaldehyde polymers with phenol, p-tert- butylphenol and cresol, such as VARCUM® 29159 and 29101 (OxyChem Company) and DURITE® 97 (Borden Chemical), formaldehyde polymers with ammonia, cresol and phenol, such as VARCUM® 29112 (OxyChem Company), formaldehyde polymers with 4,4'-(1-methylethylidene) bisphenol, such as VARCUM® 29108 and 29116 (OxyChem Company), formaldehyde polymers with cresol and phenol, such as VARCUM® 29457 (OxyChem Company), DURITE® SD-423A, SD-422A (Borden Chemical), or formaldehyde polymers with phenol and p-tert-butylphenol, such as DURITE® ESD 556C (Borden Chemical).

In embodiments, the phenolic resin may be a novolacresin. The weight average molecular weight of this resin may range from about 300 to about 50,000, such as about 500 to 35,000 or about 1,000 to about 35,000 as determined by known methods, such as gel permeation chromatography. Examples of these phenolic resins are for example, 471×75 (cured with HY283 amide hardener), ARALDITE PT810, ARALDITE MY720, and ARALDITE EPN 1138/1138 A-84 (multifunctional epoxy and epoxy novolac resins) from Ciba-Geigy; ECN 1235, 1273 and 1299 (epoxy cresol novolac resins) from Ciba-Geigy; TORLON AI-10 (poly(amideimide) resin) from Amoco; THIXON 300/301 from Whittaker Corp.; TACTIX (tris(hydroxyphenyl) methane-based epoxy resins, oxazolidenone modified tris(hydroxyphenyl) methane-based epoxy resins, and multifunctional epoxy-based novolac resins) from Dow Chemical; and EYMYD resin L-20N (polyimide resin) from Ethyl Corporation, and the like.

In embodiments, when both a phenol compound and phenolic resin are present, the overcoat coating composition may comprise from about 1 weight percent to about 30 weight percent of the phenol compound therein, such as from about 2 weight percent to about 15 weight percent of the phenol compound. In embodiments, when both a phenol compound and phenolic resin are present, the overcoat coating composition may comprise from about 10 weight percent to about 70 weight percent of the phenolic resin, such as from about 30 weight percent to about 65 weight percent of the phenolic resin, or such as from 1 weight percent to about 30 weight percent and from about 2 weight percent to about 20 weight percent of the phenolic resin.

In embodiments, when only the phenol compound is present, the overcoat coating composition may comprise from about 1 weight percent to about 70 weight percent of the phenol compound therein, such as from about 2 weight percent to about 60 weight percent. When only the phenolic resin is present, the overcoat coating composition may comprise from about 10 weight percent to about 70 weight percent phenolic resin therein, such as from about 15 weight percent to about 60 weight percent or such as from about 1 weight percent to about 30 weight percent of the phenolic resin therein and from about 2 weight percent to about 20 weight percent.

The components of the overcoat coating composition may be dispersed in a coating solvent. Examples of components that can be selected for use as coating solvents in the overcoat coating composition include ketones, alcohols, aromatic hydrocarbons, halogenated aliphatic hydrocarbons, ethers, amides, esters, and the like. Specific examples of solvents include cyclohexanone, acetone, methyl ethyl ketone, methanol, ethanol, 1-butanol, amyl alcohol, 1-methoxy-2-propanol, toluene, xylene, chlorobenzene, carbon tetrachloride, chloroform, methylene chloride, trichloroethylene, tetrahydrofuran, dioxane, diethyl ether, dimethyl formamide, dimethyl acetamide, butyl acetate, ethyl acetate, methoxyethyl acetate, and the like.

Solvents suitable for use herein should not interfere with other components of the overcoat coating composition or the photoconductive member structure, and evaporate from the overcoat coating composition during curing. In embodiments, the solvent is present in the overcoat coating composition in an amount from about 50 weight percent to about 90 weight percent, such as from about 50 weight percent to about 80 weight percent, of the overcoat coating composition.

The overcoat coating composition may further include optional components such as a polymer binder and the like. A polymer binder may be employed to achieve improved coating and coating uniformity.

The polymer binder may include one or combination of thermoplastic and thermosetting resins such as polyamide, polyurethane, polyvinyl acetate, polyvinyl butyral, polysiloxane, polyacrylate, polyvinyl acetal, phenylene oxide resin, terephthalic acid resin, phenoxy resin, epoxy resin, acrylonitrile copolymer, cellulosic film former, poly(amideimide), melamine-formaldehyde resin and the like. These polymers may be block, random or alternating copolymers. The polymer binder such as polyvinylbutyral (PVB) may provide a desired rheology for the coating, and may improve the coating quality of the overcoat film. In embodiments, the polymer binder is polyvinyl butyral.

In embodiments, if present, the polymer binder is present in the overcoat coating composition in an amount from about 1 weight percent to about 50 weight percent, such as from about 1 weight percent to about 25 weight percent or from about 5 weight percent to about 20 weight percent or such as from about 1 weight percent to about 15 weight percent, of the overcoat coating composition.

The overcoat coating composition may be applied by any suitable application technique, such as spraying dip coating, roll coating, wire wound rod coating, and the like. In embodiments, the overcoat coating composition may be coated onto any layer of the photoconductive imaging member, such as the charge transport layer, the charge generating layer, a combination charge transport/charge generating layer, or the like.

After the overcoat coating composition is coated onto the photoreceptor device, the coating composition can be cured at a temperature from about 50° C. to about 250° C., such as from about 80° C. to about 200° C. or from about 100° C. to about 175° C. The deposited overcoat layer may be cured by any suitable technique, such as oven drying, infrared radiation drying, and the like.

The curing may take from about 1 minute to about 80 minutes, such as from about 10 minutes to about 60 minutes. The curing reaction substantially forms a crosslinked structure, which may be confirmed when the overcoat layer does not dissolve in part or in its entirety when contacted with organic solvents. Thus, organic solvents may be used to confirm the formation of a crosslinked product. If a substantially crosslinked product is formed, the organic solvent will not usually dissolve any component of the overcoat layer. Such suitable organic solvents may include alkylene halide, like methylene chloride; alcohol methanol, ethanol, phenol, and the like; ketone, like acetone; and the like. Any suitable organic solvent, and mixtures thereof, may be employed to confirm the formation of a substantially crosslinked overcoat layer if desired.

In embodiments, the overcoat coating composition is first prepared by mixing the phenolic resin and/or a phenol compound with the charge transport compound in an alcohol solution and an acid catalyst. In embodiments, optional components may be mixed into the overcoat coating composition.

Further, the overcoat layer may be formed by the reaction of the charge transport compound and the phenolic resin and/or phenol compound to form a crosslinked product. When the charge transport compound is in the presence of the phenolic resin and/or phenol compound, the —OR group becomes a leaving group and the alkylene linking group L becomes an alkylene cation. This alkylene cation reacts with the phenolic resin and/or phenol compound to form a product. Such a reaction may take place with each —OR group present on the charge transport compound. Replication of this reaction among these components forms a high molecular weight linked and substantially crosslinked structure. In embodiments, this reaction occurs in the presence of an acid catalyst.

The overcoat coating composition may optionally include an acid catalyst to assist in curing. The acid catalyst may be an inorganic acid such as hydrochloric acid, sulfuric acid, nitric acid, and the like, and derivatives thereof; an organic acid such as acetic acid, trifluoroacetic acid, oxalic acid, formic acid, glycolic acid, glyoxylic acid, and the like; or a polymeric acid such as poly(acrylic acid), poly(vinyl chloride-co-vinyl acetate-co-maleic acid), toluenesulfonic acid, and the like. The acid catalyst may be a methanesulfonic acid, a benzenesulfonic acid, a naphthalenesulfonic acid, and the like, and derivatives thereof. Mixtures of any suitable acids may also be employed. In embodiments, derivates of the acid catalyst refers to, for example, salts thereof, for example salts with an organic base, such as pyridine, piperidine, and the like.

In embodiments, if present, the catalyst is present in the overcoat coating composition in an amount from about 0.01 weight percent to about 15 weight percent, such as from about 0.1 weight percent to about 10 weight percent or from about 0.5 weight percent to about 5 weight percent or from about 0.001 weight percent to about 5 weight percent, such as from about 0.001 weight percent to about 4 weight percent, of the overcoat coating composition.

In one reaction sequence, the charge transport compound, such as a charge transport compound and the phenol compound, is reacted to form a substantially crosslinked compound as follows.

Scheme 1.

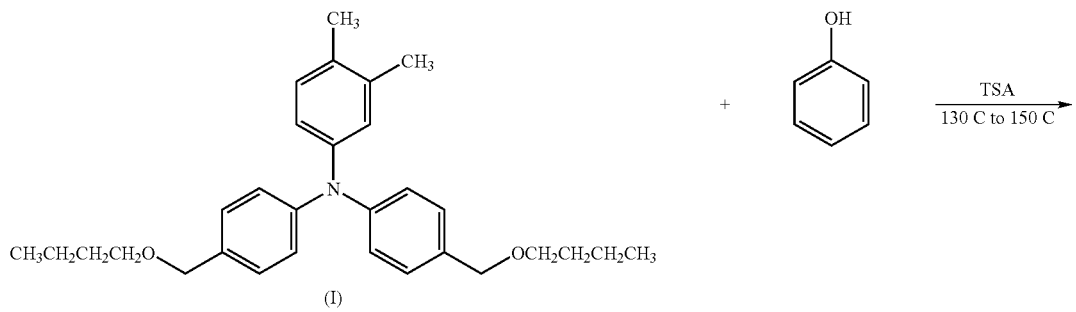

-continued

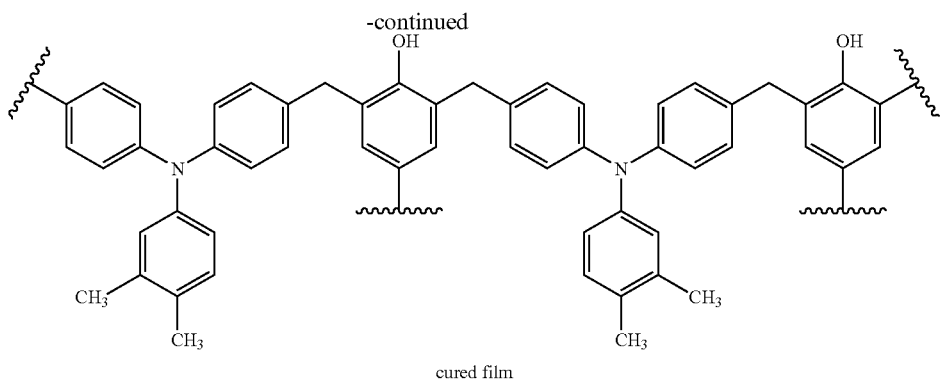

cured film

In other embodiments, the charge transport compound may not crosslink with the phenol compound but may be uniformly dispersed throughout the substantially crosslinked product of phenol compound(s).

The overcoat layer described herein may be continuous and may have a thickness of less than about 75 micrometers, for example from about 0.1 micrometers to about 60 micrometers, such as from about 0.1 micrometers to about 50 micrometers or from about 1 to about 25 micrometers.

The overcoat layer disclosed herein in embodiments can achieve excellent adhesion to the charge transport layer or other adjacent layer of the photoconductive imaging member without substantially negatively affecting the electrical performance of the imaging member to an unacceptable degree.

The photoconductive members are, in embodiments, multilayered photoreceptors that comprise a substrate, an optional conductive layer, an optional undercoat layer, an optional adhesive layer, a charge generating layer, a charge transport layer, and the above-described overcoat layer.

Illustrative examples of substrate layers selected for the photoconductive imaging members, and which substrates may be known substrates and which can be opaque or substantially transparent, comprise a layer of insulating material including inorganic or organic polymeric materials, such as MYLAR®, a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid, and may have a number of many different configurations, such as, a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as polycarbonate materials commercially available as MAKROLON®.

The thickness of the substrate layer depends on a number of factors, including the characteristics desired and economical considerations, thus this layer may be of substantial thickness, such as over 3,000 microns, such as from about 3,000 to about 7,000 microns or of minimum thickness, such as at least about 50 microns, providing there are no significant adverse effects on the member. In embodiments, the thickness of this layer is from about 75 microns to about 300 microns.

If a conductive layer is used, it is positioned over the substrate. The term "over" as used herein in connection with many different types of layers, as well as the term "under," should be understood as not being limited to instances where the specified layers are contiguous. Rather, the term refers to relative placement of the layers and encompasses the inclusion of unspecified intermediate layers between the specified layers.

Suitable materials for the conductive layer include aluminum, zirconium, niobium, tantalum, vanadium, hafnium, titanium, nickel, stainless steel, chromium, tungsten, molybdenum, copper, and the like, and mixtures and alloys thereof.

The thickness of the conductive layer is, in one embodiment, from about 20 angstroms to about 750 angstroms, and, in another from about 50 angstroms to about 200 angstroms, for a suitable combination of electrical conductivity, flexibility, and light transmission. However, the conductive layer can, if desired, be opaque.

The conductive layer can be applied by known coating techniques, such as solution coating, vapor deposition, and sputtering. In embodiments, an electrically conductive layer is applied by vacuum deposition. Other suitable methods can also be used.

If an undercoat layer is employed, it may be positioned over the substrate, but under the charge generating layer. The undercoat layer is at times referred to as a hole-blocking layer in the art.

Suitable undercoat layers for use herein include polymers, such as polyvinyl butyral, epoxy resins, polyesters, polysiloxanes, polyamides, polyurethanes, and the like, nitrogen-containing siloxanes or nitrogen-containing titanium compounds, such as trimethoxysilyl propyl ethylene diamine, N-beta (aminoethyl) gamma-aminopropyl trimethoxy silane, isopropyl 4-aminobenzene sulfonyl titanate, di(dodecylbenezene sulfonyl) titanate, isopropyl di(4-aminobenzoyl) isostearoyl titanate, isopropyl tri(N-ethyl amino) titanate, isopropyl trianthranil titanate, isopropyl tri(N,N-dimethyl-ethyl amino) titanate, titanium-4-amino benzene sulfonate oxyacetate, titanium 4-aminobenzoate isostearate oxyacetate, gamma-aminobutyl methyl dimethoxy silane, gamma-aminopropyl methyl dimethoxy silane, and gamma-aminopropyl trimethoxy silane, as disclosed in U.S. Pat. Nos. 4,338,387, 4,286,033 and 4,291,110.

The undercoat layer may be applied as a coating by any suitable conventional technique such as spraying, die coating, dip coating, draw bar coating, gravure coating, silk screening, air knife coating, reverse roll coating, vacuum deposition, chemical treatment and the like. For convenience in obtaining layers, the undercoat layers may be applied in the form of a dilute solution, with the solvent being removed after deposition of the coating by conventional techniques such as by vacuum, heating and the like. Drying of the deposited coating may be achieved by any suitable technique such as oven drying, infrared radiation drying, air drying and the like.

In fabricating a photoconductive imaging member, a charge generating layer is deposited and a charge transport layer may be deposited onto the substrate surface either in a laminate type configuration where the charge generating layer and charge transport layer are in different layers or in a single layer configuration where the charge generating layer and charge transport layer are in the same layer along with a binder resin. In embodiments, the charge generating layer is applied prior to the charge transport layer.

The charge generating layer is positioned over the undercoat layer. If an undercoat layer is not used, the charge generating layer is positioned over the substrate. In embodiments, the charge generating layer is comprised of amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge generating layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is desired for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film-forming binder material may be employed as the matrix in the charge generating (photogenerating) binder layer. Typical polymeric film forming materials include those described, such as, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

A photogenerating composition or pigment may be present in the resinous binder composition in various amounts. Generally, however, from about 5 percent by volume to about 90 percent by volume of the photogenerating pigment is dispersed in about 10 percent by volume to about 95 percent by volume of the resinous binder, and typically from about 20 percent by volume to about 30 percent by volume of the photogenerating pigment is dispersed in about 70 percent by volume to about 80 percent by volume of the resinous binder composition. The photogenerator layers can also fabricated by vacuum sublimation in which case there is no binder.

In embodiments, any suitable technique may be used to mix and thereafter apply the photogenerating layer coating mixture. Typical application techniques include spraying, dip coating, roll coating, wire wound rod coating, vacuum sublimation and the like. For some applications, the charge generating layer may be fabricated in a dot or line pattern. Removing of the solvent of a solvent coated layer may be effected by any suitable technique such as oven drying, infrared radiation drying, air drying and the like. In embodiments, the charge generating layer is from about 0.1 micrometers to about 100 micrometers thick, such as from about 0.1 micrometers to about 50 micrometers.

In embodiments, a charge transport layer may be employed. The charge transport layer may comprise a charge-transporting molecule, such as, a small molecule, dissolved or molecularly dispersed in a film forming electrically inert polymer such as a polycarbonate. The expression charge transporting "small molecule" is defined herein as a monomer that allows the free charge photogenerated in the generator layer to be transported across the transport layer. In embodiments, the term "dissolved" refers to, for example, forming a solution in which the molecules are distributed in the polymer to form a homogeneous phase. In embodiments, the expression "molecularly dispersed" refers to a dispersion in which a charge transporting small molecule dispersed in the polymer, for example on a molecular scale.

Any suitable charge transporting or electrically active small molecule may be employed in the charge transport layer.

Typical charge transporting molecules include, for example, pyrene, carbazole, hydrazone, oxazole, oxadiazole, pyrazoline, arylamine, arylmethane, benzidine, thiazole, stilbene and butadiene compounds; pyrazolines such as 1-phenyl-3-(4'-diethylaminostyryl)-5-(4'-diethylamino phenyl) pyrazoline; diamines such as N,N'-diphenyl-N, N'-bis(3-methylphenyl)-(1,1'-biphenyl)-4,4'-diamine; hydrazones such as N-phenyl-N-methyl-3-(9-ethyl)carbazyl hydrazone and 4-diethyl amino benzaldehyde-1,2-diphenylhydrazone; oxadiazoles such as 2,5-bis (4-N,N'-diethylaminophenyl)-1, 2,4-oxadiazole; poly-N-vinylcarbazole, poly-N-vinylcarbazole halide, polyvinyl pyrene, polyvinylanthracene, polyvinylacridine, a pyrene-formaldehyde resin, an ethylcarbazole-formaldehyde resin, a triphenylmethane polymer and polysilane, and the like.

In embodiments, to minimize or avoid cycle-up in machines with high throughput, the charge transport layer may be substantially free (such as, from zero to less than about two percent by weight of the charge transport layer) of triphenylmethane. As indicated above, suitable electrically active small molecule charge transporting compounds are dissolved or molecularly dispersed in electrically inactive polymeric film forming materials.

An exemplary small molecule charge transporting compound that permits injection of holes from the pigment into the charge generating layer with high efficiency and transports them across the charge transport layer with very short transit times is N,N'-diphenyl-N,N'-bis(3-methylphenyl)-(1, 1'-biphenyl)-4,4'-diamine. If desired, the charge transport material in the charge transport layer may comprise a polymeric charge transport material or a combination of a small molecule charge transport material and a polymeric charge transport material.

In embodiments, the charge transport layer may contain an active aromatic diamine molecule, which enables charge transport, dissolved or molecularly dispersed in a film forming binder. An exemplary charge transport layer is disclosed in U.S. Pat. No. 4,265,990, the entire disclosure of which is incorporated herein by reference.

Any suitable electrically inactive resin binder that is ideally substantially insoluble in the solvent such as alcoholic solvent used to apply the optional overcoat layer may be employed in the charge transport layer. Typical inactive resin binders include polycarbonate resin, polyester, polyarylate, polyacrylate, polyether, polysulfone, and the like. Molecular weights can vary, such as from about 20,000 to about 150,000. Exemplary binders include polycarbonates such as poly (4,4'-isopropylidene-diphenylene)carbonate (also referred to as bisphenol-A-polycarbonate); polycarbonate, poly (4,4'-cyclohexylidinediphenylene) carbonate (referred to as bisphenol-Z polycarbonate), poly (4,4'-isopropylidene-3,3'-dimethyl-diphenyl)carbonate (also referred to as bisphenol-C-polycarbonate), and the like.

Any suitable charge transporting polymer may also be utilized in the charge transporting layer of this disclosure. The charge transporting polymer should be insoluble in the solvent employed to apply the overcoat layer. These electrically active charge transporting polymeric materials should be capable of supporting the injection of photogenerated holes from the charge generating material and be capable of allowing the transport of these holes therethrough.

Any suitable technique may be utilized to mix and thereafter apply the charge transport layer coating mixture to the charge generating layer. Typical application techniques include spraying, dip coating, roll coating, wire wound rod coating, and the like. Drying of the deposited coating may be effected by any suitable technique such as oven drying, infrared radiation drying, air drying and the like.

Generally, the thickness of the charge transport layer is from about 10 to about 100 micrometers, but a thickness outside this range can also be used. A charge transport layer should be an insulator to the extent that the electrostatic charge placed on the charge transport layer is not conducted in the absence of illumination at a rate sufficient to prevent formation and retention of an electrostatic latent image thereon. In general, the ratio of the thickness of a charge transport layer to the charge generating layers may be maintained from about 2:1 to 200:1, and in some instances as great as 400:1. Typically, a charge transport layer is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

Additionally, adhesive layers can be provided, if necessary or desired, between any of the layers in the photoreceptors to ensure adhesion of any adjacent layers. Alternatively, or in addition, adhesive material can be incorporated into one or both of the respective layers to be adhered. Such optional adhesive layers may have a thickness of about 0.001 micrometer to about 0.2 micrometer. Such an adhesive layer can be applied, for example, by dissolving adhesive material in an appropriate solvent, applying by hand, spraying, dip coating, draw bar coating, gravure coating, silk screening, air knife coating, vacuum deposition, chemical treatment, roll coating, wire wound rod coating, and the like, and drying to remove the solvent. Suitable adhesives include film-forming polymers, such as polyester, DuPont 49,000 (available from E. I. DuPont de Nemours & Co.), VITEL PE-100 (available from Goodyear Tire and Rubber Co.), polyvinyl butyral, polyvinyl pyrrolidone, polyurethane, polymethyl methacrylate, and the like.

Optionally, an anti-curl backing layer may be employed to balance the total forces of the layer or layers on the opposite side of the supporting substrate layer. An example of an anti-curl backing layer is described in U.S. Pat. No. 4,654,284, the entire disclosure of which is incorporated herein by reference. A thickness from about 70 to about 160 micrometers may be a satisfactory range for flexible photoreceptors.

Processes of imaging, especially xerographic imaging, and printing, including digital, are also encompassed herein. More specifically, the photoconductive imaging members can be selected for a number of different known imaging and printing processes including, for example, electrophotographic imaging processes, especially xerographic imaging and printing processes wherein charged latent images are rendered visible with toner compositions of an appropriate charge polarity. Moreover, the imaging members of this disclosure are useful in color xerographic applications, particularly high-speed color copying and printing processes.

Also included in the present disclosure are methods of imaging and printing with the photoconductive devices illustrated herein. These methods generally involve the formation of an electrostatic latent image on the imaging member, followed by developing the image with a toner composition comprised, for example, of thermoplastic resin, colorant, such as pigment, charge additive, and surface additives, reference U.S. Pat. Nos. 4,560,635; 4,298,697 and 4,338,390, the disclosures of which are totally incorporated herein by reference, subsequently transferring the image to a suitable substrate, and permanently affixing the image thereto.

The following Examples are submitted to illustrate embodiments of the present disclosure.

EXAMPLE 1

Preparation of N,N-bis(4-butoxymethylphenyl)-3,4-dimethylphenylamine

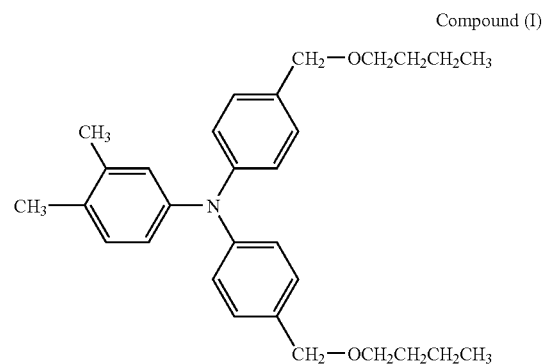

Compound (I)

A mixture of N,N-bis(4-hydroxymethylphenyl)-3,4-dimethylphenylamine (25 g), 1-BuOH (100 g) and an ion exchange resin AMBERLYST 15 (5 g) was shaken at room temperature until the reaction was completed as indicated by thin layer chromatography (TLC). The mixture was filtered to remove the AMBERLYST 15 catalyst. Removal of the solvent under reduced pressure yielded charge transport compound (I) as an oily product. The structure was confirmed by ¹H NMR spectrum.

EXAMPLE 2

Preparation of N,N-bis(4-methoxymethylphenyl)-3,4-dimethylphenylamine

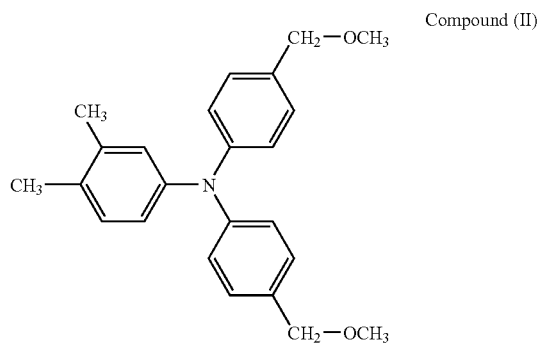

Compound (II)

A mixture of N,N-bis(4-hydroxymethylphenyl)-3,4-dimethylphenylamine (25 g), methanol (150 g) and an ion exchange resin AMBERLYST 15 (5 g) was shaken at room temperature until the reaction was completed as indicated by TLC. The mixture was filtered to remove the AMBERLYST 15 catalyst. Removal of the solvent under reduced pressure yielded charge transport compound (II) as an oily product. The structure was confirmed by ¹H NMR spectrum.

PHOTORECEPTOR DEVICE: COMPARATIVE EXAMPLE

An electrophotographic photoreceptor was prepared in the following manner. A coating solution for an undercoat layer comprising 100 parts of a ziconium compound (trade name: Orgatics ZC540), 10 parts of a silane compound (trade name: A110, manufactured by Nippon Unicar Co., Ltd), 400 parts of isopropanol solution and 200 parts of butanol was prepared. The coating solution was applied onto a cylindrical aluminum substrate subjected to honing treatment by dip coating, and dried at 150° C. for 10 minutes to form an undercoat layer having a film thickness of 0.1 micrometer.

A 0.5 micron thick charge generating layer (CGL) was subsequently dip coated on top of the undercoat layer from a dispersion of Type V hydroxygallium phthalocyanine (12 parts), alkylhydroxy gallium phthalocyanine (3 parts), and a vinyl chloride/vinyl acetate copolymer, VMCH (Mn=27,000, about 86 weight percent of vinyl chloride, about 13 weight percent of vinyl acetate and about 1 weight percent maleic acid) available from Dow Chemical (10 parts), in 475 parts of n-butylacetate.

Subsequently, a 20 μm thick charge transport layer (CTL) was dip coated on top of the charge generating layer from a solution of N,N'-diphenyl-N,N'-bis(3-methylphenyl)-1,1'-biphenyl-4,4'-diamine (82.3 parts), 2.1 parts of 2,6-Di-tert-butyl-4-methylphenol (BHT) from Aldrich and a polycarbonate, PCZ-400 [poly(4,4'-dihydroxy-diphenyl-1-1-cyclohexane), $M_w$=40,000] available from Mitsubishi Gas Chemical Company, Ltd. (123.5 parts) in a mixture of 546 parts of tetrahydrofuran (THF) and 234 parts of monochlorobenzene. The CTL was dried at 115° C. for 60 minutes.

PHOTORECEPTOR EXAMPLE 3

An overcoated photoreceptor device was fabricated as follows: a coating solution was prepared by mixing charge transport compound (I) (2.25 g), PL4852 (2.75 g, a phenol resin from Gun'ei Kagaku Kogyo K.K.), and a p-toluenesulfonic acid derivative (0.05 g), and 1-butanol (16.75 g). The solution was applied onto the charge transport layer of the control photoreceptor by the dip-coating technique, and dried by heating at 130° C. for 40 minutes to form an overcoat protective layer having a film thickness of 2.8 μm.

PHOTORECEPTOR EXAMPLE 4

An overcoated photoreceptor device was fabricated according to Example 3, except that the overcoat was dried by heating at 150° C. for 40 minutes.

PHOTORECEPTOR EXAMPLE 5

An overcoated photoreceptor device was fabricated as follows: a coating solution was prepared by mixing charge transport compound (I) (2.25 g), PL4852 (2.75 g, a phenol resin from Gun'ei Kagaku Kogyo K.K.), and a p-toluenesulfonic acid derivative (0.15 g), and 1-butanol (16.75 g). The solution was applied onto the charge transport layer of the control photoreceptor by the dip-coating technique, and dried by heating at 130° C. for 40 minutes to form an overcoat protective layer having a film thickness of 2.6 μm.

PHOTORECEPTOR EXAMPLE 6

An overcoated photoreceptor device was fabricated according to Example 5, except that the overcoat was dried by heating at 150° C. for 40 minutes.

PHOTORECEPTOR EXAMPLE 7

An overcoated photoreceptor device was fabricated as follows: a coating solution was prepared by mixing charge transport compound (I) (2.25 g), 2,6-bis(hydroxymethyl)-p-cresol (2 g.), a polyvinyl butyral resin (0.75 g, trade name: BX-L, manufactured by Sekisui Chemical Co., Ltd.), and a p-toluenesulfonic acid derivative (0.15 g), and 1-butanol (16.75 g). The solution was applied onto the charge transport layer of the control photoreceptor by the dip-coating technique, and dried by heating at 130° C. for 40 minutes to form an overcoat protective layer having a film thickness of 3.2 μm.

PHOTORECEPTOR EXAMPLE 8

An overcoated photoreceptor device was fabricated as follows: a coating solution was prepared by mixing charge transport compound (I) (2.25 g), PL4852 (2.25 g, a phenol resin from Gun'ei Kagaku Kogyo K.K.), a polyvinyl butyral resin (0.5 g, trade name: BX-L, manufactured by Sekisui Chemical Co., Ltd.), and a p-toluenesulfonic acid derivative (0.05 g), and 1-butanol (16.75 g). The solution was applied onto the charge transport layer of the control photoreceptor by the dip-coating technique, and dried by heating at 150° C. for 40 minutes to form an overcoat protective layer having a film thickness of 3.2 μm.

PHOTORECEPTOR EXAMPLE 9

An overcoated photoreceptor device was fabricated according to Example 3, except that charge transport compound (II) was used in place of charge transport compound (I).

PHOTORECEPTOR EXAMPLE 10

An overcoated photoreceptor device was fabricated according to Example 8, except that charge transport compound (II) was used in place of charge transport compound (I).

Results

The electrophotographic photoreceptors of Examples 3-10 were evaluated in comparison with Comparative Example. The print tests were carried out in a printing machine under ambient environment (from about 20° C. to about 25° C.). The initial image quality and the image quality after 1000 prints were analyzed. The above photoreceptor devices were tested for wear in a wear fixture that contained a bias charging roll for charging. Wear was calculated in terms of nanometers/kilocycles of rotation (nm/Kc). The results are shown below in Table 1. All overcoated photoreceptors show significantly reduced wear rates as compared to the control device.

TABLE 1

| Photoreceptor Device | Image quality (initial) | Image quality (after 1,000 prints) | Wear rate (nm/kcycle) |
|---|---|---|---|
| Comparative Example | Good | Good | 85 |
| Example 3 | Good | Good | 33 |
| Example 4 | Good | Good | 25 |
| Example 5 | Good | Good | 17 |
| Example 6 | Good | Good | 10 |
| Example 7 | Good | Good | 35 |
| Example 8 | Good | Good | 19 |
| Example 9 | Good | Good | 23 |

It will be appreciated that various of the above-disclosed and other features and functions, or alrernativis thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A photoconductive member comprising:
    a charge generating layer;
    a charge transport layer;
    a conductive substrate layer; and
    a layer in contact with the charge transport layer comprising a substantially crosslinked resin of at least a phenol compound and a charge transport compound uniformly dispersed throughout the substantially crosslinked resin without being crosslinked with the phenol compound, wherein the charge transport compound is represented by:

A-(L-OR)$_n$ wherein A represents a charge transport component, L represents a linkage group, O represents oxygen, R represents a hydrocarbyl group, and n represents a number of repeating segments or groups; wherein
    the charge generating layer and the charge transport layer are contained in a single layer; and wherein
    the phenol compound is a resole phenolic resin, and wherein the layer in contact with the charge transport layer further comprises a polymer binder selected from the group consisting of polyamide, polyurethane, polyvinyl acetate, polyvinyl butyral, polysiloxane, polyacrylate, polyvinyl acetal, phenylene oxide resin, terephthalic acid resin, phenoxy resin, epoxy resin, acrylonitrile copolymer, cellulosic film former, poly(amideimide), and melamine-formaldehyde resin.

2. The photoconductive member according to claim 1, wherein the linkage group is an alkylene and the hydrocarbyl is an alkyl.

3. The photoconductive member according to claim 2, wherein the alkylene is a methylene and the alkyl has 1 to about 8 carbon atoms.

4. The photoconductive member according to claim 1, wherein the charge transport component is selected from the group consisting of a tertiary arylamine, pyrazoline, hydrazone, oxadiazole and stilbene.

5. The photoconductive member according to claim 1, wherein the charge transport component is selected from the group consisting of:

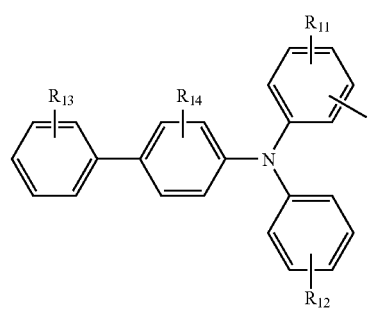

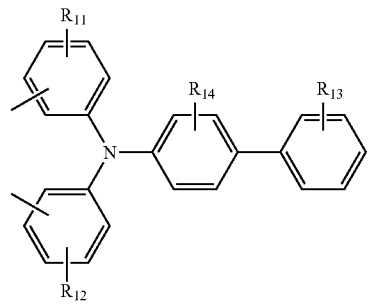

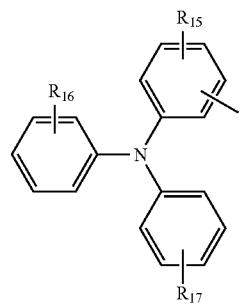

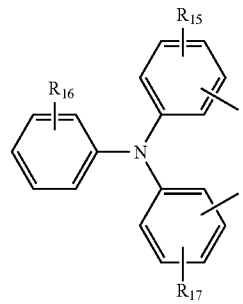

-continued

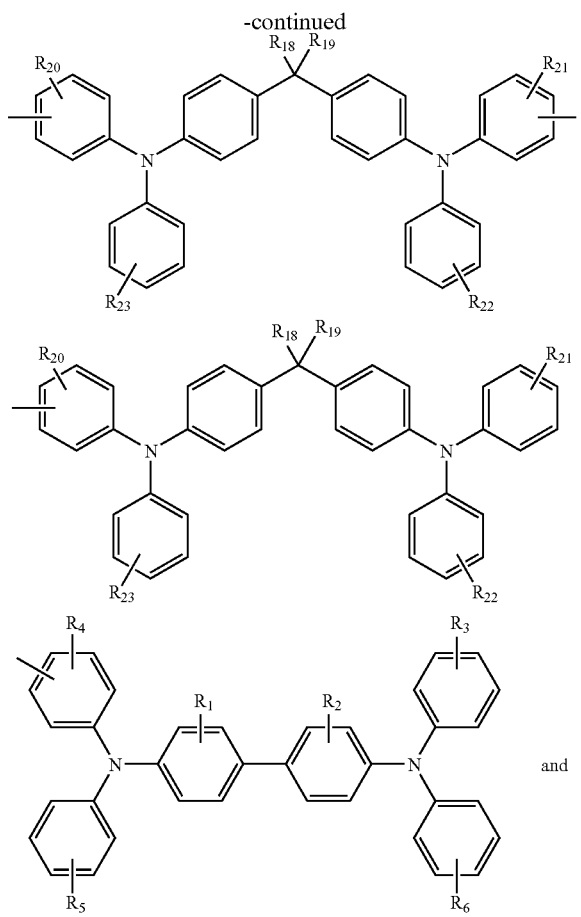

and

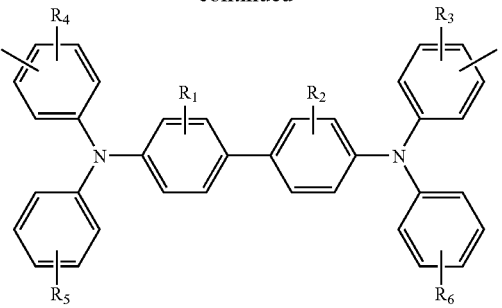

wherein $R_1$ to $R_6$ and $R_{11}$ to $R_{23}$ are each selected from the group consisting of a hydrogen atom, an alkyl group, an alkoxy and halogen atoms.

6. The photoconductive member according to claim 1, wherein R is linear, branched or cyclic.

7. The photoconductive member according to claim 1, wherein the layer in contact with the charge transport layer has a thickness of from about 0.1 micrometers to about 50 micrometers.

8. The photoconductive member according to claim 1, wherein the charge generating layer includes at least a phthalocyanine.

9. An image forming apparatus comprising:
at least one charging unit,
at least one exposing unit,
at least one developing unit,
a transfer unit,
a cleaning unit, and
the photoconductive member of claim 1.

* * * * *